United States Patent [19]  [11] 4,318,836
Abolins  [45] Mar. 9, 1982

[54] TITANIUM DIOXIDE FILLED POLYPHENYLENE ETHER COMPOSITIONS

[75] Inventor: Visvaldis Abolins, Delmar, N.Y.

[73] Assignee: General Electric Company, Pittsfield, Mass.

[21] Appl. No.: 209,796

[22] Filed: Nov. 24, 1980

[51] Int. Cl.$^3$ .............................................. C08K 5/49
[52] U.S. Cl. ................................. 524/141; 524/497; 524/505
[58] Field of Search ............. 260/30.6 R, 42.47, 37 R

[56] References Cited

U.S. PATENT DOCUMENTS

| | | | |
|---|---|---|---|
| 3,708,455 | 1/1973 | Nakanishi et al. | 260/37 R |
| 3,850,879 | 11/1974 | Anderson | 260/37 R |
| 3,923,929 | 12/1975 | Wright et al. | 260/37 R |
| 4,166,812 | 9/1979 | Lee | 260/42.47 |
| 4,233,199 | 11/1980 | Abolins et al. | 260/42.22 |
| 4,239,673 | 12/1980 | Lee | 260/30.6 R |

Primary Examiner—Lewis T. Jacobs
Attorney, Agent, or Firm—Hedman, Casella, Gibson and Costigan

[57] ABSTRACT

Compositions comprising a polyphenylene ether resin, an impact modifier such as an A-B-A$^1$ block copolymer, a plasticizer and particulate titanium dioxide in which the particles have a mean particle size no greater than 0.6 micron, provide unexpected retention of Gardner impact resistance.

9 Claims, No Drawings

TITANIUM DIOXIDE FILLED POLYPHENYLENE ETHER COMPOSITIONS

This invention is concerned with compositions comprising a polyphenylene ether resin, an impact modifier, a plasticizer and titanium dioxide filler. More specifically, it has been discovered that if the titanium dioxide has a mean particle size no greater than 0.6 micron, the impact strength of the resulting composition as measured by the Gardner method is unexpectedly retained in comparison with the corresponding composition without the titanium dioxide.

BACKGROUND OF THE INVENTION

The polyphenylene ether resins are well known in the art as comprising a family of thermoplastic materials which are suitable for various engineering purposes. These may be made by catalyzed and non-catalyzed processes described in the patent literature, such as in Hay, U.S. Pat. Nos. 3,306,874 and 3,306,875, and in Stamatoff, U.S. 3,257,357 and U.S. 3,257,358, all of which are incorporated herein by reference.

It is known that the polyphenylene ether resins may be admixed with polystyrene, either unmodified or modified, to produce compositions having properties better than those of either of the two polymers individually. Such compositions are disclosed in Cizek, U.S. Pat. No. 3,383,435, which is incorporated herein by reference.

To reduce the cost, it has been proposed to add mineral fillers such as aluminum silicate, calcium carbonate, magnesium silicate, calcium silicate, silica or others, to compositions containing a polyphenylene ether resin and polystyrene. Compositions comprising a polyphenylene ether resin, a rubber modified high impact polystyrene and aluminum silicate are disclosed in U.S. Pat. No. 4,166,812.

Copending application Ser. No. 755,025, filed Dec. 28, 1976, discloses compositions comprising a polyphenylene ether resin, alone, or in combination with an impact modifier which is not a high impact rubber modified polystyrene, a mineral filler and a plasticizer.

It is proposed in application Ser. No. 209,797 filed concurrently herewith that the Gardner impact strength of filled compositions comprising a polyphenylene ether, an impact modifier such as an A-B-A$^1$ block copolymer and a plasticizer can be surprisingly retained if a particulate clay filler having a certain particle size is employed in such compositions.

It is known that the addition of mineral fillers to polyphenylene ether resins can increase the rigidity and dimensional stability of the polymers. The toughness of the resulting composite is usually lower than that of the mineral filler-free polymer, however. It has been found that some mineral fillers increase the rigidity of the polymer and provide ductile composites having good impact resistance. Such benefits are more pronounced in falling weight-type impact tests, such as Gardner impact resistance. This type of impact resistance is much more important in actual practice than the impact resistance as measured by other means such as the Izod impact test.

It has now been discovered that as among mineral fillers in general, titanium dioxide particles having a particle size no greater than 0.6 micron, and preferably 0.2 micron or less, provides retention of Gardner impact strength when included in a composition composed of polyphenylene ether, an impact modifier and a plasticizer, which constitutes an improvement.

DESCRIPTION OF THE INVENTION

According to this invention, there are provided thermoplastic compositions comprising:

(a) a polyphenylene ether resin, alone, or together with an impact modifier;

(b) an effective amount of a plasticizer; and (c) titanium dioxide having a mean particle size no greater than 0.6 micron.

Preferably, the titanium dioxide is characterized by a particle size of about 0.1–0.2 micron. The surface area of the titanium dioxide is typically relatively low, e.g., 8.8 to 10 square meters per gram ($m^2/g$).

The preferred polyphenylene ether resins are those having the formula:

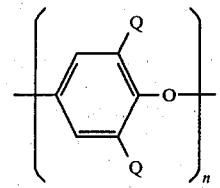

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

The preparation of polyphenylene ether resins corresponding to the above formula is described in the above-mentioned patents of Hay and Stamatoff.

The most preferred polyphenylene ether resin for use in this invention is poly(2,6-dimethyl-1,4-phenylene)ether.

The particular impact modifier employed in the compositions is not critical and can be selected from a wide variety of elastomeric materials. By way of illustration, the term "impact modifier" employed herein includes copolymers of styrene and elastomeric materials such as acrylonitrile, EPDM rubber, maleic anhydride or diene rubber. Examples include copolymers of styrene and acrylonitrile, copolymers of styrene and butadiene, copolymers of styrene and maleic anhydride and copolymers of styrene and EPDM rubber. Other examples include terpolymers of styrene, acrylonitrile and butadiene, and terpolymers of styrene, butadiene and styrene of the A-B-A type or radial teleblock type, either hydrogenated or unhydrogenated.

Special mention is made of A-B-A$^1$ block copolymers wherein terminal blocks A and A$^1$ are the same or different and are derived from a vinyl aromatic compound, e.g., styrene, α-methyl styrene, vinyl toluene, vinyl xylene, vinyl naphthalene, and the like, and center block B is derived from a conjugated diene, i.e., butadiene, isoprene, 1,3-pentadiene, 2,3-dimethyl butadiene, and the like. Hydrogenated derivatives of the foregoing are also preferred. Both the unhydrogenated and hydrogenated forms can be prepared by methods described in that patent literature, e.g., U.S. Pat. Nos. 3,251,905; U.S. 3,231,635; and U.S. 3,431,323, which are incorporated herein by reference.

The plasticizer can be selected from among any materials known to impart compatibility with polyphenylene ether resin. Preferably, the plasticizer is an aromatic phosphate, and especially a compound having the formula:

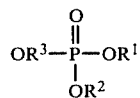

wherein $R^1$, $R^2$ and $R^3$ are the same or different and are alkyl, haloalkyl, cycloalkyl, halocycloalkyl, aryl, haloaryl, alkyl substituted aryl, haloalkyl substituted aryl, aryl substituted alkyl, haloaryl substituted alkyl, hydroxyalkyl, hydroxyaryl, hydroxyalkaryl, halogen and hydrogen.

Examples include cresyl diphenyl phosphate, 2-ethylhexyl diphenyl phosphate, tricresyl phosphate, triisopropylphenyl phosphate, triphenyl phosphate, triethyl phosphate, di-butyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethylhexyl phenyl and tri-2-ethylhexyl phosphate or mixtures thereof. Especially preferred is triphenyl phosphate.

The ingredients, especially the polymeric components, in the compositions of this invention can vary widely. Preferably, however, the compositions comprise from about 5 to about 95 parts by weight of the polyphenylene ether resin, from about 95 to about 5 parts by weight of the impact modifier, from about 5 to about 50 parts by weight of the plasticizer, and from about 5 to about 50 parts by weight of titanium dioxide.

Other ingredients, such as stabilizers, flame retardant agents, drip retardants, antioxidants, antistatic agents, coloring agents, pigments, mold release agents, and the like, can also be included for their conventionally employed purposes.

The compositions of this invention are prepared in any manner. Usually, however, the ingredients are formed into a preblend by tumbling in a mixer, the preblend is extruded at a temperature of from 550° F. to 620° F., the extrudate is cut into smaller pieces, and the pieces are injection molded at a temperature of from 530° F. to 640° F.

DESCRIPTION OF THE PREFERRED EMBODIMENTS

The compositions of this invention are illustrated in the following examples, which are not intended to be limiting.

EXAMPLES 1-2

Compositions according to this invention are prepared by tumbling the ingredients, extruding the resulting blend in a Werner Pfleiderer 28 mm twin screw machine at a temperature of 590° F. and injection molding the extrudate on a Newbury machine at a temperature of 600° F., mold temperature 180° F.

The compositions after molding are evaluated for physical properties according to ASTM standards. The compositions and physical properties are summarized in the Table.

TABLE

Compositions Comprising a Polyphenylene Ether Resin, a Hydrogenated A-B-A Block Copolymer, Triphenyl Phosphate and Titanium Dioxide

| Ingredients, parts by weight | 1 | 2 |
|---|---|---|
| Poly(2,6-dimethyl-1,4-phenylene)ether | 95 | 95 |
| Hydrogenated styrene-butadiene-styrene block copolymer[a] | 5 | 5 |
| Triphenyl phosphate | 10 | 10 |
| Ti Pure LW[d] | 18 | — |
| Ti Pure R-101[d] | — | 18 |
| Physical Properties | | |
| Mean particle size, micrometers | 0.12 | 0.18 |
| pH | 7–8.5 | 6–7 |
| Gardner impact strength, in.-lbs. | 300–400 | 290 |

[a]Shell Chemical's Kraton G 1652
[d]TiO$_2$ manufactured by DuPont (R-101 = rutile form; LW = anatase form; both contain organic processing aid)

Other modifications and variations of the present invention are possible in view of the foregoing description. It is to be understood, therefore, that changes may be made in the particular embodiments of the invention without departing from the principles or scope of the invention defined in the appended claims and without sacrifice to the chief benefits.

I claim:

1. A thermoplastic composition comprising:
   (a) a polyphenylene ether resin, alone, or together with an impact modifier;
   (b) an effective amount of a plasticizer; and
   (c) titanium dioxide having mean particle size no greater than 0.6 micron.

2. A composition as defined in claim 1, in which the impact modifier is an A-B-A$^1$ block copolymer wherein terminal blocks A and A$^1$ are derived from a vinyl aromatic compound and center block B is derived from a conjugated diene.

3. A composition as defined in claim 2, in which the terminal blocks are polystyrene and the center block is polybutadiene.

4. A composition as defined in claim 2, in which the A-B-A$^1$ block copolymer has been hydrogenated.

5. A composition as defined in claim 1, in which the polyphenylene ether resin has the formula

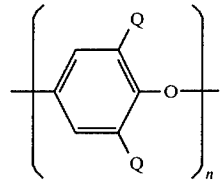

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

6. A composition as defined in claim 1, in which the polyphenylene ether resin is poly(2,6-dimethyl-1,4-phenylene) ether.

7. A composition as defined in claim 1, in which the plasticizer is triaryl phosphate.

8. A composition as defined in claim 1, in which the plasticizer is triphenyl phosphate.

9. A composition as defined in claim 1, comprising from about 5 to about 95 parts by weight of said polyphenylene ether resin, from about 95 to 5 parts by weight of said impact modifier, from about 5 to about 50 parts by weight of said plasticizer and from about 5 to about 50 parts by weight of said titanium dioxide.

* * * * *

REEXAMINATION CERTIFICATE (2706th)

United States Patent [19]
Abolins

[11] B1 4,318,836
[45] Certificate Issued Oct. 31, 1995

[54] TITANIUM DIOXIDE FILLED POLYPHENYLENE ETHER COMPOSITIONS

[75] Inventor: Visvaldis Abolins, Delmar, N.Y.

[73] Assignee: General Electric Company, Pittsfield, Mass.

Reexamination Request:
No. 90/003,025, Apr. 12, 1993

Reexamination Certificate for:
Patent No.: 4,318,836
Issued: Mar. 9, 1982
Appl. No.: 209,796
Filed: Nov. 24, 1980

[51] Int. Cl.$^6$ .............. C08K 5/52; C08K 3/22; C08L 53/00
[52] U.S. Cl. .............. 524/141; 524/497; 524/505
[58] Field of Search .............. 524/141, 497, 524/505

[56] References Cited

U.S. PATENT DOCUMENTS

| | | | |
|---|---|---|---|
| 3,639,506 | 2/1972 | Haaf | 260/874 |
| 3,737,479 | 6/1973 | Haaf | 260/824 R |
| 4,191,685 | 3/1980 | Haaf et al. | 260/45.95 G |
| 4,293,478 | 10/1981 | Sugio et al. | 260/37 R |
| 4,525,508 | 6/1985 | Lee, Jr. | 524/140 |

OTHER PUBLICATIONS

Goto, Handbook of Plastic & Rubber Additives, 1970, pp. 630–632 partial translation.

Sato, Physical Properties of Filling polymers, Jan. 20, 1978, p. 48 partial translation.

Patton, Pigment Handbook, 1973, pp. 253, 258–259.

*Primary Examiner*—Paul R. Michl

[57] ABSTRACT

Compositions comprising a polyphenylene ether resin, an impact modifier such as an A-B-A$^1$ block copolymer, a plasticizer and particulate titanium dioxide in which the particles have a mean particle size no greater than 0.6 micron, provide unexpected retention of Gardner impact resistance.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–9 are cancelled.

* * * * *